March 17, 1936.  J. A. MOLLER  2,033,992
METHOD OF AND APPARATUS FOR SUPPLYING LUBRICANT TO BEARINGS
Filed May 20, 1932
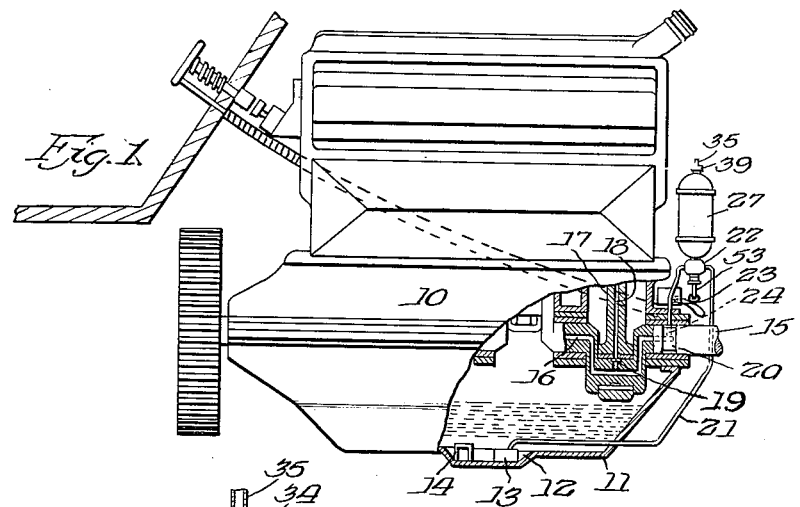
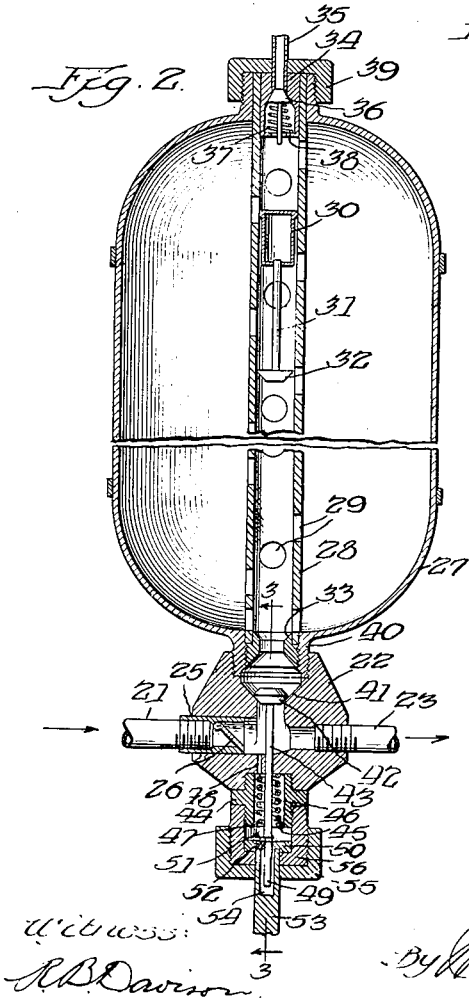
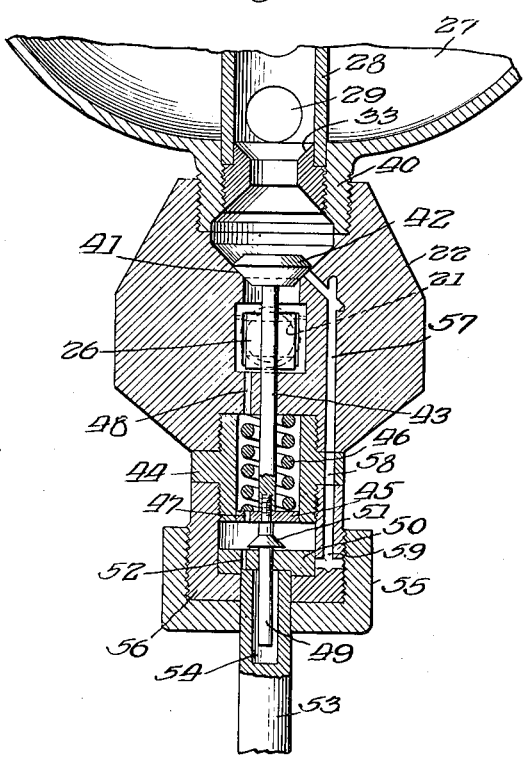
Inventor,
Joseph A. Moller Patented Mar. 17, 1936

2,033,992

UNITED STATES PATENT OFFICE 2,033,992

METHOD OF AND APPARATUS FOR SUPPLYING LUBRICANT TO BEARINGS

Joseph A. Moller, Evanston, Ill.

Application May 20, 1932, Serial No. 612,399

20 Claims. (Cl. 184—6)

My invention relates to a method of and apparatus for supplying lubricant to the bearings and working parts of a machine prior to or coincident with the starting of the machine from a period of rest, and is particularly adapted for use with force feed systems for internal combustion engines and the like.

Another and further object of my invention is the provision of a method of and apparatus for supplying a lubricant to the working or bearing parts of a machine coincident with the starting operation thereof to insure the bearings being properly lubricated during the starting operation.

A further object of my invention is the provision of a method and apparatus in connection with a force feed system of supplying lubricant wherein a supply of lubricant is automatically stored in reserve until such time as the machine or parts are started in motion, when a supply of lubricant is forced by the storage pressure through the system coincident with or prior to the starting, so that the surfaces are properly lubricated during the starting operation.

Another and further object of the invention is the provision of a lubricant supply means which is entirely automatic in its operation, particularly when used in connection with a force feed system for supplying lubricants to working parts of machines, and which requires no attention or care on the part of the operator.

A still further object of my invention is the provision of a method of and means for lubricating a machine wherein a quantity of lubricant is supplied to the working parts of the machine preliminary to and coincident with the starting of the machine and until such time as the pressure or regular system used is in effect, whereupon the lubricant is discontinued from the auxiliary supply, but stores up a sufficient quantity of available lubricant for use in the next or succeeding starting of the machine.

Another and further object of my invention is the provision of a method and means for filling of the lubricant conduits in connection with a force feed lubricating system prior to or coincident with the operation of the pump or means normally operating to force the lubricant through the system thereby shortening the time when the pump begins to supply lubricant to the bearings, particularly the ones most remote from the pump, thus shortening the lag in time when such system begins to function, it being understood that the lubricant drains from the bearings and conduits during the rest period.

It is a well recognized fact in the lubrication of machines, that the greatest degree of wear on the bearings occurs during the starting and stopping operations. Probably eighty to ninety percent of the wear takes place in the starting operation due to a number of causes, perhaps the greatest being due to the fact that the lubricant has been forced from between the bearing surfaces in contact because the parts are at rest, and has drained away therefrom by gravity or otherwise, there is no motion of the rotating parts to carry the lubricant over and between the bearing surfaces, and the film of lubricant has entirely disappeared from the bearing surfaces and has also drained by gravity or otherwise from the feed or supply lines. As the machine is put into operation, the bearing surfaces being in contact with each other, grind together with a metal to metal contact, resulting in wear on the bearings and general destruction of the bearing surfaces. When the machine stops, the wear is not quite so great, because usually the load is removed from the engine and the pressure is not as great upon the wearing parts. Even though the parts are beginning to slow down in operation, the surfaces carry a small amount of lubricant until the parts actually come to rest. Therefore, the need for supplying lubricant to the bearings is not as great during the stopping of the machine as it is at the starting operation.

With my improved system, I am able to first fill the lubricant feed lines with lubricant at the machine's approximate operating pressures, and secondly to supply a quantity of lubricant to the bearings prior to or coincident with starting and to continue this supply for a short period of time after the parts are in operation, depending upon the requirements and needs of the particular system.

These and other objects of my invention will be more fully and better understood by reference to the accompanying drawing, in which—

Figure 1 is a view of an internal combustion engine with my improved invention applied thereto;

Figure 2 is a detailed sectional elevational view of the auxiliary tank adapted to supply lubricant to the moving parts; and Figure 3 is a detailed enlarged sectional view showing the valve operating parts for the auxiliary tank.

Referring now specifically to the drawing and in which like reference characters refer to like parts throughout, an internal combustion engine is shown having the usual head block 10 and an oil reservoir pan 11 with a sump 12 therein at the bottom of the reservoir 11, within which an oil pump 13 is mounted having the usual intake screen 14. A crank shaft 15 of the internal combustion engine is shown, having the usual oil conduit 16 therein. Connecting rods 17 having the piston heads thereon, are connected to the crank shaft 15 in the usual manner and have an oil groove 18 extending longitudinally thereof, through which oil passes to the wrist pins. A circumferentially extending oil groove 19 extends around the crank shaft at the connecting arm bearing, and a second oil groove 20 extends around the crank shaft in the main rear bearing adjacent the main bearing thereof. This arrangement is the conventional form of lubrication now employed for internal combustion engines and forms no part of my present invention.

A discharge pipe 21 is provided leading from the pump 13 to a body member 22. The member 22 has a continuous passage extending therethrough at the opposite side of which a pipe 23 is connected which leads to the inner main bearing of the crank shaft of the engine, and is adapted to discharge a lubricant into the groove 20 surrounding the crank shaft 15, and from which the lubricant passes to the operating parts of the engine. A short communicating groove 24 is provided through which the oil flows from the groove 20 to the conduit 16. Mounted on the intake end of the member 22 is a nipple 25 into which the pipe 21 is screw-threaded, with a check valve 26 being provided which prevents the oil flowing back into the pipe 21 when placed under pressure beyond this check 26.

On the upper side of the member 22 an auxiliary tank 27 is provided having a hollow stem 28 extending longitudinally thereof through which a plurality of holes 29, 29 are positioned in spiral arrangement throughout the length of the pipe 28. The pipe 28 has a float 30 mounted therein upon which a valve stem 31 is positioned upon the lower end of which a valve 32 is mounted adapted to cooperate with the valve seat 33 formed in the lower side of the tank 27 to close the outlet from the tank 27 during the operation of the device, as will be described hereinafter.

At the upper end of the pipe 28 is fitted a plug 34 having a pipe 35 extending therethrough and a valve 36 mounted therein which is actuated by a spring 37 seated against the valve 36, and a web portion 38 formed at the lower end of the plug 34. A cap 39 is provided which is screw-threaded onto a trunnion formed on the upper end of the auxiliary tank 27 and through which the pipe 35 extends. The tank 27 has an externally threaded trunnion 40 at the lower end thereof which is threaded into the member 22 and has a chamber formed therein which cooperates in shape with a recess formed on the upper side of the member 22 and with the valve seat 41 being provided against which a valve 42 seats. A stem 43 is connected to the valve 42 which extends downward through an opening formed in the member 22 and into a coupling member 44 and has a circular disc member 45 secured thereto at its bottom. A spring 46 is mounted in the member 44 which spring operates lightly and with sufficient force only to keep the valve 42 in contact with the seat 41.

A port 47 is provided through the disc 45, with a second port 48 being provided through the body 22 which communicates with the chamber formed in the member 22. A second stem 49 is provided which is screw-threaded at its upper end into the lower end of the stem 43, with a shoulder portion abutting against the disc 45, and extends through a disc 50 which is adjacent the frusto-conical shaped portion 51 of the member 49. A port 52 is provided in the disc 50 for leakage of the oil, as will be hereinafter described. A plunger member 53 is provided having a recess 54 in the end thereof within which the member 49 extends, but does not seat, and which extends to some portion of the starting mechanism. A screw-threaded cap member 55 is provided which is threaded onto a second cap member 56, which in turn is threaded onto the member 44.

A by-pass 57 is provided in the member 22 which communicates with the chamber in the upper portion of the member 22 and extends through the valve seat 41. This by-pass communicates with the pass 58 formed through the member 44, and an L-shaped passage 59 formed in the cap member 56 which terminates adjacent the side wall of the member 50 which closes passage in the position shown.

In the normal operation of the device, assuming that the auxiliary tank 27 is empty, lubricant pumped through the pump 13, through the pipe 21, will flow unrestricted through he member 22 and out of the pipe 23 to the bearings in the usual manner. As soon as the pressure builds up in the line, the slight resistance of the spring 46 is overcome, the valve 42 is lifted, and a portion of the oil flows into the auxiliary tank 27 unseating the valve 32 as it does so. As the tank fills with oil, the float 30 rises in the pipe 29 with the level of the oil. A portion of the oil continues to flow into the tank 27 until the pressure in this tank equals the pressure at which the system is being operated due to the air trapped above the oil level, and when this condition is reached the pump continuing to operate, the oil flows directly through the member 22 as the machine continues to run, and the outlet pipe 23 to the bearings and working parts of the engine. If the pressure in lines 21, 22, and 23 drops, the valve 42 seats, and if the pressure increases the valve 42 is forced open and oil is taken into the auxiliary tank until again the pressure is equalized. In effect, therefore, auxiliary tank 27 takes oil from line up to its maximum pressure during any one run of the machine. Thereupon, as the automobile engine is stopped and discontinues operation, the pressure on the oil system of course decreases, usually to zero, and the oil in the auxiliary tank 27 is held in this tank by the valve 42 at pressure received during operation. The stem 43 is connected to some portion of the starting mechanism of the machine so that coincident with the starting operation the member 53 is pushed upward, which in turn pushes member 52 upward carrying with it stem 49 through action of disc 50, which unseats the valve 42, whereupon the oil in the auxiliary tank 27 is forced out through the member 22 and outlet pipe 23 and through all of the conduits and to all of the bearings of the machine.

The opening of the valve 42 also opens the by-pass 57 and permits the lubricant to flow therethrough and its connecting passes 58 and 59 to the under side of the member 50, so that if the pressure in the starting device is removed, the valve 42 will remain open until the oil has leaked back into the oil supply system to a point where the pressure on the member 50 is greater than the pressure under it, whereupon the disc 50 drops and the valve 42 is closed. Should the starting mechanism be held open, however, with the valve 42 in open position until the oil level in the auxiliary tank 27 has decreased until the float 30 has reached a level so the valve 32 seats, no more lubricant can flow from the tank 27 until its supply is replenished, leaving a quantity of oil in the tank which acts as a seal to prevent the escape of air from the tank 27.

If in the meantime the pump 13 has started to operate and the oil pressure is built up sufficiently to overcome the pressure from the tank 27, the valve 26 is opened and the oil flows directly from the pump to the bearings, and as the pressure increases the tank 27 is refilled with oil, ready for another operation.

It may be desirable at times to supply the auxiliary tank 27 with air under pressure and therefore the stem 35 is provided through which air may be pumped or otherwise forced into the chamber 27 to assist in supplying sufficient pressure to force oil from the tank at the starting of the engine. It will thus be understood that a supply of oil is withdrawn from the auxiliary tank 27 by the normal operation of the oil supply system and is there held under pressure until the engine is started and coincident with the starting of the engine, the valves from the tank 27 are opened so that a supply of lubricant is forced through the entire lubricating system of the internal combustion engine, coincident with or slightly prior to the starting of the automobile engine.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. In combination with a lubricating system, having a main supply conduit, an auxiliary supply tank connected to said supply conduit and adapted to receive lubricant therefrom, a valve mounted in the inlet of said tank, and means whereby said valve is opened prior to the starting of the machine to be lubricated.

2. In combination with a lubricating system having a main supply conduit, an auxiliary supply tank connected to said supply conduit and adapted to receive lubricant therefrom, a valve mounted in the inlet of said tank, means whereby said valve is opened prior to the starting of the machine to be lubricated, and means whereby backward flow of the lubricant in said supply conduit is prevented.

3. In combination with a lubricating system having a main supply conduit, an auxiliary tank having a passage thereto from the supply conduit, a valve located in said passage adapted to control the pasage of lubricant into and out of said tank, connecting means for said valve whereby the said valve is opened prior to the starting of the machine to be lubricated, and a check valve whereby the lubricant is prevented from back-flowing in the conduit.

4. A lubricating system including a main supply conduit, an auxiliary tank having a passage to said main supply conduit, a valve located in said passage whereby lubricant is admitted into and permitted to flow from said tank, a spring adapted to normally retain the said valve in closed position, and means connecting said valve with the starting mechanism.

5. A lubricating system comprising a main supply conduit, a body member mounted therein having a passage therethrough continuous with said supply conduit and having a passage communicating with said main passage, a valve located in said second passage, an auxiliary tank on said body member having a passage therein in communication with the said second passage in the body member, and operating connections whereby the valve is opened coincident with the starting of the machine to be lubricated.

6. A lubricating system comprising a main supply conduit, a body member mounted therein having a passage therethrough continuous with said supply conduit and having a passage communicating with said main passage, a valve located in said second passage, an auxiliary tank mounted upon said body member having a passage therein in communication with the said second passage in the body member, and operating connections whereby the valve is opened coincident with the starting of the machine to be lubricated and held in open position for a short period of time.

7. A lubricating system comprising a main supply conduit, a body member mounted therein having a passage therethrough continuous with said supply conduit and having a passage communicating with said main passage, a valve located in said second passage, an auxiliary tank on said body member having a passage therein in communication with the said second passage in the body member, a valve in said tank adapted to operate to close the passage at a predetermined liquid level of said tank, and operating connections whereby the valve is opened coincident with the starting of the machine to be lubricated.

8. A lubricating system comprising a main supply conduit, a body member mounted therein having a passage therethrough continuous with said supply conduit and having a passage communicating with said main passage, a valve located in said second passage, an auxiliary tank on said body member having a passage therein in communication with the said second passage in the body member, a float in said tank, a valve on said float, and operating connections whereby the valve is opened coincident with the starting of the machine to be lubricated and held in open position for a short period of time.

9. A lubricating system comprising a main supply conduit, a body member mounted therein having a passage therethrough continuous with said supply conduit and having a passage communicating with said main passage, a valve located in said second passage, an auxiliary tank on said body member having a passage therein in communication with the said second passage in the body member, a perforated pipe in said tank, a float in said pipe, a valve connected to said float, and operating connections whereby the valve is opened coincident with the starting of the machine to be lubricated and held in open position for a short period of time.

10. A lubricating system comprising a main supply conduit, a body member mounted therein having a passage therethrough continuous with said supply conduit and having a passage communicating with said main passage, a valve located in said second passage, an auxiliary tank on said body member having a passage therein in communication with the said second passage in the body member, and operating connections whereby the valve is opened coincident with the starting of the machine to be lubricated, the body member having a by-pass therein whereby lubricant passes around said valve and holds the valve in open position for a short period of time.

11. In combination with a pressure lubricating system for internal combustion engines, including an oil pump, a conduit leading therefrom to the parts to be lubricated, a tank having a passage thereto from said conduit, a valve in said conduit adjacent the entrance of said passage, a valve in said passage controlling the flow of lubricant into and out of said tank, and operating means for the opening of said valve.

12. In combination with a pressure lubricating system, an auxiliary tank in communication with the conduit through which lubricant normally passes, valve means located out of the main line of flow of the lubricant whereby a quantity of lubricant is trapped in said tank, and means to actuate the valve means whereby the trapped lubricant is released from said tank prior to the movement of the bearing surfaces after a rest period.

13. In combination with a pressure lubricating system for internal combustion engines, an auxiliary tank in connection with a conduit leading to the parts to be lubricated, valved means located out of the main line of flow of the lubricant whereby a supply of lubricant is trapped in said tank under pressure, and actuating means for said valved means whereby the lubricant in said tank is released therefrom prior to the movement of the parts to be lubricated after a rest period.

14. Means for supplying oil under pressure to a lubricating system for an internal combustion engine, which comprises means for supplying a stream of fluid lubricant to the bearings, valve means located out of the main line of flow of the lubricant for trapping under pressure a portion of the oil pumped through the same system, and means for actuating the valve means whereby the trapped oil supply is released to the circulatory system prior to the movement of the bearing parts.

15. Means for lubricating bearings for an internal combustion engine, which comprises means whereby constant circulation of oil is maintained through the bearings during the normal operation of the system, valve means located out of the main line of flow of the lubricant whereby a supply of oil from said circulating stream is trapped under pressure during the normal operation and valve actuating means whereby said trapped supply of oil is released into the circulating system prior to the movement of the bearings of the engine.

16. In combination with a pressure lubricating system of an auxiliary tank placed adjacent the intake end of the lubricating supply conduit leading to the parts to be lubricated and in connection with said conduit, valve means in the conduit leading to said auxiliary tank whereby a supply of lubricant is trapped in said auxiliary tank under pressure and actuating means whereby said trapped lubricant is released into said lubricating supply conduit from said tank prior to the movement of the parts to be lubricated after a rest period, and means in said supply conduit whereby the released lubricant is prevented from flowing backwards toward the lubricant supply source.

17. In combination with a pressure lubricating system comprising a pump and a conduit leading therefrom, an auxiliary tank, a conduit connecting said tank and the conduit leading from said pump, a valve controlling said connecting conduit, and actuating means for said valve whereby lubricant trapped in said tank is released into the lubricating system.

18. In combination with a pressure lubricating system, an auxiliary tank connected to the main supply conduit, valve means controlling the inflow and outflow of the lubricant into and out of said tank positioned out of the main line of flow of the lubricant, and means whereby the valve controlling the outflow of the lubricant from said tank is opened coincident with the starting of the engine.

19. Means for lubricating bearings of internal combustion engines, which comprises means for forcing the lubricant into the bearings during the normal operation thereof, an auxiliary tank, valve means out of the normal line of flow of the lubricant and positioned in the conduit leading to said tank whereby a supply of lubricant is trapped in said auxiliary tank, and means whereby said valve is opened, thereby releasing the trapped supply of lubricant in said tank prior to the beginning of the operation of the bearing parts.

20. In a mechanism of the class described for lubricating the bearings of rotating members prior to the lubrication thereof by the normal lubricating means the combination with normal lubricating means including a supply line, of a reservoir adapted to receive lubricant from the supply line, a valve closing the reservoir against discharge of the lubricant therefrom, manual means operable for releasing the lubricant in the reservoir to the bearings, yieldable means for returning the valve to its seat, and means controlling the movement of the valve by the yielding means to provide a sufficient time interval between the opening and closing thereof for effecting the operation of the normal lubricating means.

JOSEPH A. MOLLER.